United States Patent
Yuratich

(10) Patent No.: US 10,454,219 B2
(45) Date of Patent: Oct. 22, 2019

(54) METHODS AND APPARATUS FOR RENDERING ELECTRICAL CABLES SAFE

(71) Applicant: Michael Yuratich, Hamble (GB)

(72) Inventor: Michael Yuratich, Hamble (GB)

( * ) Notice: Subject to any disclaimer, the term of this patent is extended or adjusted under 35 U.S.C. 154(b) by 0 days.

(21) Appl. No.: 16/133,023

(22) Filed: Sep. 17, 2018

(65) Prior Publication Data
US 2019/0052022 A1 Feb. 14, 2019

Related U.S. Application Data

(63) Continuation of application No. 15/422,368, filed on Feb. 1, 2017, now Pat. No. 10,079,457.

(51) Int. Cl.
| | |
|---|---|
| *H01R 12/59* | (2011.01) |
| *H01R 13/655* | (2006.01) |
| *H02K 5/22* | (2006.01) |
| *H02K 11/40* | (2016.01) |
| *H01R 4/2408* | (2018.01) |
| *E21B 43/12* | (2006.01) |
| *H01R 4/44* | (2006.01) |
| *H02G 3/32* | (2006.01) |
| *H02G 15/105* | (2006.01) |
| *H01R 9/03* | (2006.01) |
| *H01R 4/48* | (2006.01) |

(52) U.S. Cl.
CPC ......... *H01R 13/655* (2013.01); *E21B 43/128* (2013.01); *H01R 4/2408* (2013.01); *H01R 4/44* (2013.01); *H02G 3/32* (2013.01); *H02G 15/105* (2013.01); *H02K 5/225* (2013.01); *H02K 11/40* (2016.01); *H01R 4/4818* (2013.01); *H01R 9/031* (2013.01); *H01R 9/032* (2013.01); *H01R 12/596* (2013.01)

(58) Field of Classification Search
CPC ..... H01R 12/596; H01R 9/032; H01R 4/4818
USPC ................ 439/411, 412, 413, 417, 425, 431
See application file for complete search history.

(56) References Cited

U.S. PATENT DOCUMENTS

| | | | | |
|---|---|---|---|---|
| 4,201,433 A | * | 5/1980 | Caldwell ................ | H01R 4/646 439/98 |
| 6,591,055 B1 | * | 7/2003 | Eslambolchi ........ | G02B 6/2558 385/136 |
| 2012/0052721 A1 | * | 3/2012 | Watson ................ | E21B 17/025 439/519 |

* cited by examiner

*Primary Examiner* — Abdullah A Riyami
*Assistant Examiner* — Justin M Kratt
(74) *Attorney, Agent, or Firm* — Matthew J Patterson

(57) ABSTRACT

A "safe grounding apparatus" (SGA) for safely grounding or neutralizing the electrical conductors for permanent magnet motor (PMM) powered artificial lift systems and methods of practicing the same are disclosed. The SGA of the present invention ameliorates some of the dangers associated with PMM's. Methods of shorting, grounding, testing and monitoring the electrical conductors of a permanent magnet motor in order to safely manipulate the conductors are also disclosed.

21 Claims, 4 Drawing Sheets

METHODS AND APPARATUS FOR RENDERING ELECTRICAL CABLES SAFE

CROSS-REFERENCE TO RELATED APPLICATIONS

This application is a continuation of U.S. patent application Ser. No. 15/422,368, filed Feb. 1, 2017 now U.S. patent Ser. No. 10/079,457, which is herein incorporated by reference.

BACKGROUND OF THE INVENTION

Field of the Invention

The present invention relates in general to artificial lift systems used to pump fluids from wells and, and more particularly, to an apparatus and method for rendering a MLE of a motor safe from electrical shock hazards.

Description of the Related Art

Hydrocarbon reservoirs produce fluid from boreholes drilled therein when the reservoir pressure is greater than the flowing pressure at the point of entry to the borehole necessary to lift the fluid to surface. When this condition is not attained it is known in the prior art to operate electric motors to drive pumps downhole, in situ, a method generally known as electric submersible pumping (ESP). The pump increases the flowing pressure sufficiently to lift the fluids to surface.

Most prior art motors used to drive ESPs have been of the three-phase alternating current asynchronous squirrel cage induction type. A power cable including electrical conductors extends from a power source at the surface and runs along the production tubing downhole to the motor. The electrical conductors of the cable are affixed to the motor before installation utilizing a connection commonly referred to as a "pot head". The section of the power cable that includes the pot head is commonly referred to as the motor lead end (MLE). The MLE is typically spliced in the field to one or more sections sometimes referred to as the power cable. Such splices are well known in the industry, such as those described in United States Patent Application number 20130052055, the disclosure of which is incorporated herein in its entirety.

There exist other embodiments of ESP systems in the prior art that utilize permanent magnet motors such as those described in U.S. patent application Ser. No. 15/356,167, the disclosure of which is incorporated herein in its entirety. Such permanent magnet motors may also use three-phase AC power and similar MLEs, pot heads and power cables. However, ESP systems utilizing permanent magnet motors differ from induction motor systems in that when the motor shaft rotates (in the absence of supply power) it acts as a generator and can impress a significant voltage across the cable conductors, resulting in an electrical shock hazard for anyone touching the conductors. The motor may be rotated by, among other things, fluid running through the pump in certain situations such as while running the system in hole, removing the system from the hole or simply the draining of the production fluid from above the pump during a power failure or power shutdown. In addition, unlike centrifugal pumps, progressive cavity pumps do not pass fluid freely and breakout friction must be overcome in order to rotate. When running in, the tubing connected to such progressive cavity pumps remains essentially void of fluid and at low pressure, while well pressure builds on the bottom of the pump. At some depth the friction may be overcome and the pump will suddenly turn. The aforementioned hazards during running in are infrequent and may not occur and therefore makes the hazards sudden and unexpected. In such situations a technician or operator may be unaware that the motor is rotating and may be producing significant voltage. It should be appreciated by those skilled in the art that in such situations the manual manipulation of the electrical conductors of the cable, such as during a splicing operation, of a permanent magnet motor poses a significant risk of electrical shock and sparking. Sparking may even cause explosions if certain gases are present in the environment near the splicing operation.

What is needed is an apparatus and method that renders a power cable of a permanent magnet motor ESP system safe for splicing and other operations.

SUMMARY OF THE INVENTION

In accordance with some aspects of the present disclosure, systems and methods related to a novel artificial lift system are disclosed.

Various embodiments of an apparatus for attachment to a plurality of power conductors electrically coupled to a permanent magnet motor are disclosed.

In some aspects of the present invention, the apparatus is a safe grounding apparatus (SGA) and includes a plurality of shorting conductors electrically coupled to the power conductors; and a connection for electrically shorting the shorting conductors.

In still other aspects of the present invention, the SGA includes a ground connector for grounding the power connectors to earth.

In yet other aspects of the present invention the SGA includes a module for monitoring physical conditions of the permanent magnet motor including voltage, resistance, speed and frequency.

In yet other aspects of the present invention a method includes rendering a plurality of conductors electrically coupled to a permanent magnet motor safe.

In still other aspects of the present invention a method includes rendering a plurality of power conductors electrically coupled to a permanent magnet motor safe includes electrically coupling a plurality of shorting conductors to the power conductors and shorting the shorting conductors. The method further includes grounding the shorting conductors.

In still further aspects of the present invention a method includes monitoring the power conductors for various electrical attributes.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
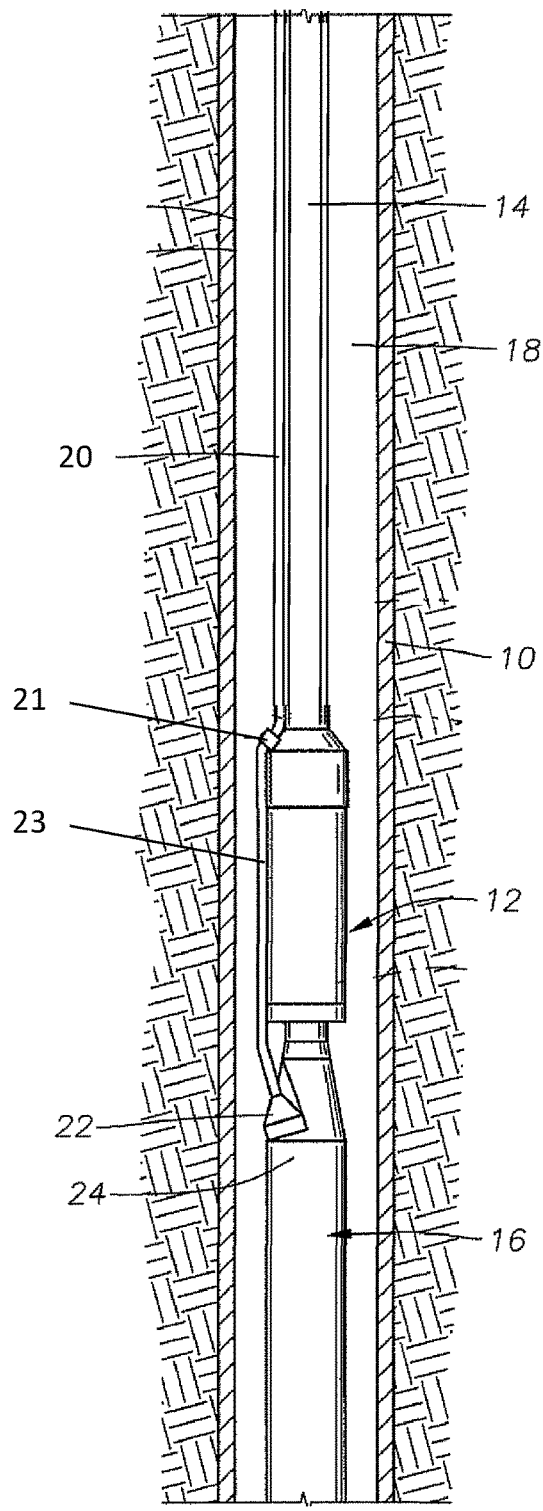
FIG. 1 is side representation of an artificial lift system within a wellbore including embodiments of the present invention.

The examples disclosed herein relate to a "safe grounding apparatus" (SGA) for safely grounding, neutralizing (or shorting), testing and monitoring the electrical conductors for permanent magnet motor (PMM) powered artificial lift systems and methods of practicing the same. The SGA of the present invention ameliorates some of the dangers associated with PMMs. The present invention provides a method of shorting, grounding and monitoring the electrical conductors of a permanent magnet motor in order to manipulate the conductors, for example, to splice the motor lead end (MLE) of a cable to a power cable. Referring to FIG. 1, there is shown a well 18 having a casing 10 and an ESP 12 coupled to a permanent magnet motor (PMM) 16 disposed in the well. ESP 12 is typical of the prior art and includes a pump and seals (not shown) and is further hydraulically connected to production pipe 14 to pump production fluids to the surface. PMM 16 may be a three phase, alternating current, type permanent magnet motor known in the prior art. MLE 23 may be comprised of an armored cable having three insulated electrical conductors enclosed therein, as will be described in more detail herein below. MLE 23 is mechanically and electrically connected to PMM 16 at pot head connector 22 in motor housing 24. Initially, MLE 23 extends upwardly along ESP 12 for several feet and in some cases for one hundred or more feet depending on the pump length and particular installation. MLE 23 is electrically connected to power cable 20 by connection 21 which connection may comprise a mechanical splice as will be explained more fully hereinafter. Power cable 20 may also be comprised of an armored cable having three insulated electrical conductors enclosed therein and extends upwardly toward the surface. For purposes of clarity and convention, the length of cable electrically attached to PMM 16 will be referred to herein as an MLE. For example, once an MLE is spliced to a section power cable the entire spliced length will continue to be referred to as an MLE. As successive sections of power cables 20 may be spliced to MLE 23 and may include another splice connection 21 (not shown) and the MLE increases in length and is ultimately connected to a power source, and may include a variable frequency drive at the surface (not shown).

Figure 2:
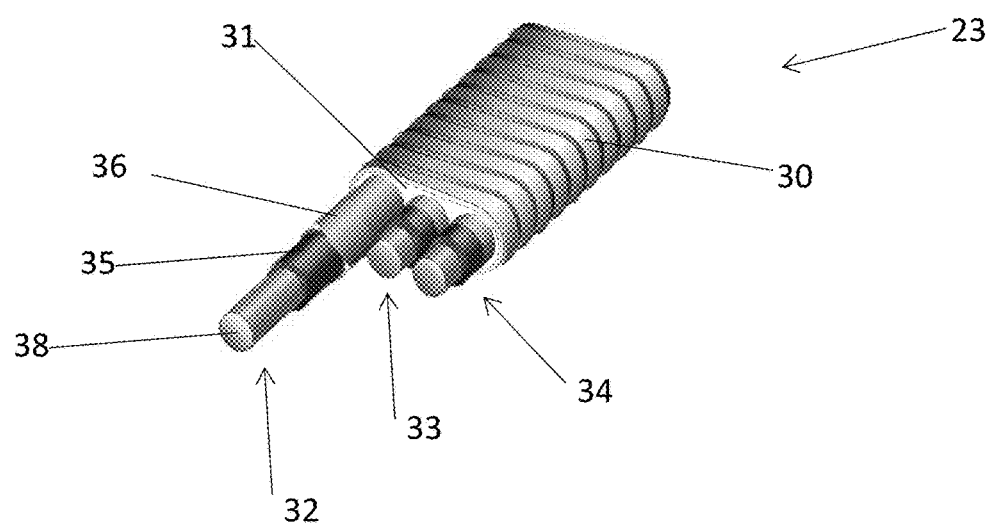
FIG. 2 is a perspective view of a prior art power cable.

Now referring to FIG. 2 there is shown a typical ESP power cable which is shown as MLE 23. Such ESP power cables may be flat as shown or may be round and may be comprised of various protective, insulative and conductive materials. An exemplary disclosure of ESP power cables for use with the present invention can be found at Petrowiki at the url address www.petrowiki.org/ESP_power_cable#cite_ref-r1_1-0, the disclosure of which is incorporated herein in its entirety. Still referring to FIG. 2, insulated conductors 32, 33, 34 include conductor 38 which is typically comprised of a solid copper (or other efficient electrically conducting material) core but may be comprised of a plurality of smaller strands. Core 38 is typically enclosed within a layer of insulation 35 which is comprised of an electrically insulating material such as ethylene propylene diene monomer rubber (EPDM) or fluorinated ethylene propylene (FEP) or the like. In the embodiment of MLE 23 shown there is also a metallic lead protective layer 36 (comprised of lead or a lead alloy) disposed around insulation 35. The three insulated conductors 32, 33, 34 are encapsulated within a protective insulating jacket 31 which protects lead insulation 36 and insulation 35 and may comprised of a nitrile or EPDM rubber material. MLE 23 is overwrapped with metallic armor 30 which may be comprised of a galvanized steel and provides mechanical protection to insulated conductors 32, 33, 34. For purposes of simplicity and clarity, and without departing from the scope of the present invention, MLE 23 and power cable 20 as used herein can be assumed to be comprised of the elements described immediately above with reference to FIG. 2.

It is known in the prior art to mechanically connect PMM 16, ESP 12 and at least a few sections of production pipe 14 at the surface. It is further known to attach pot head 22 to PMM 16 and MLE 23 to the side of ESP at the surface. With the various components assembled at the surface as described, an operator lowers the assembly into well 18. There are various situations within the art that necessitate the placement of a splice connection 21 in the embodiment described. For instance, a first splice connection 21 between MLE and power cable 20 is typically made on site as ESP 12 and PMM 16 are positioned within well 18. An operator further attaches successive sections of production pipe 14, continues to lower the assembled components into well 18, and makes splice connections 21 as needed until ESP 12 is positioned at a predetermined depth within the well. In addition, MLE 23 may be damaged, either during installation in the well or thereafter, and necessitate that a splice connection 21 be placed to restore electrical connectivity to PMM 16. A typical splice connection 21 may comprise any known connector including as described herein above with reference to US20130052055.

As described herein above, and with reference to FIG. 2, a typical splice connection 21 of the prior art is a field splice connector that may require trimming or cutting the cable end, removing the wound armor 30, stripping back the protective insulating jacket 31, preparing the conductors 38 by removing layers 35, 36, installing a conducting splice member such as a ferrule crimp, and the use of insulating and amalgamating tapes for encapsulating the splice. The process may take two hours or more. Many of these steps require a skilled technician to use his bare hands exposing him to the potential of a shock hazard. As will be described more fully herein below, the present invention ensures that at all times during a splicing operation there is no hazardous voltage present on the conductors 38 being worked on. Since PMM 16 is the voltage source of concern, the afore mentioned hazards are prevented by the present invention at the splice end of MLE 23. In order to facilitate existing safe working practices for splicing, and to guard against certain failure modes of the hazard prevention means, additional steps are taken with the section of power cable yet to be spliced as disclosed herein above and below.

Figure 3:
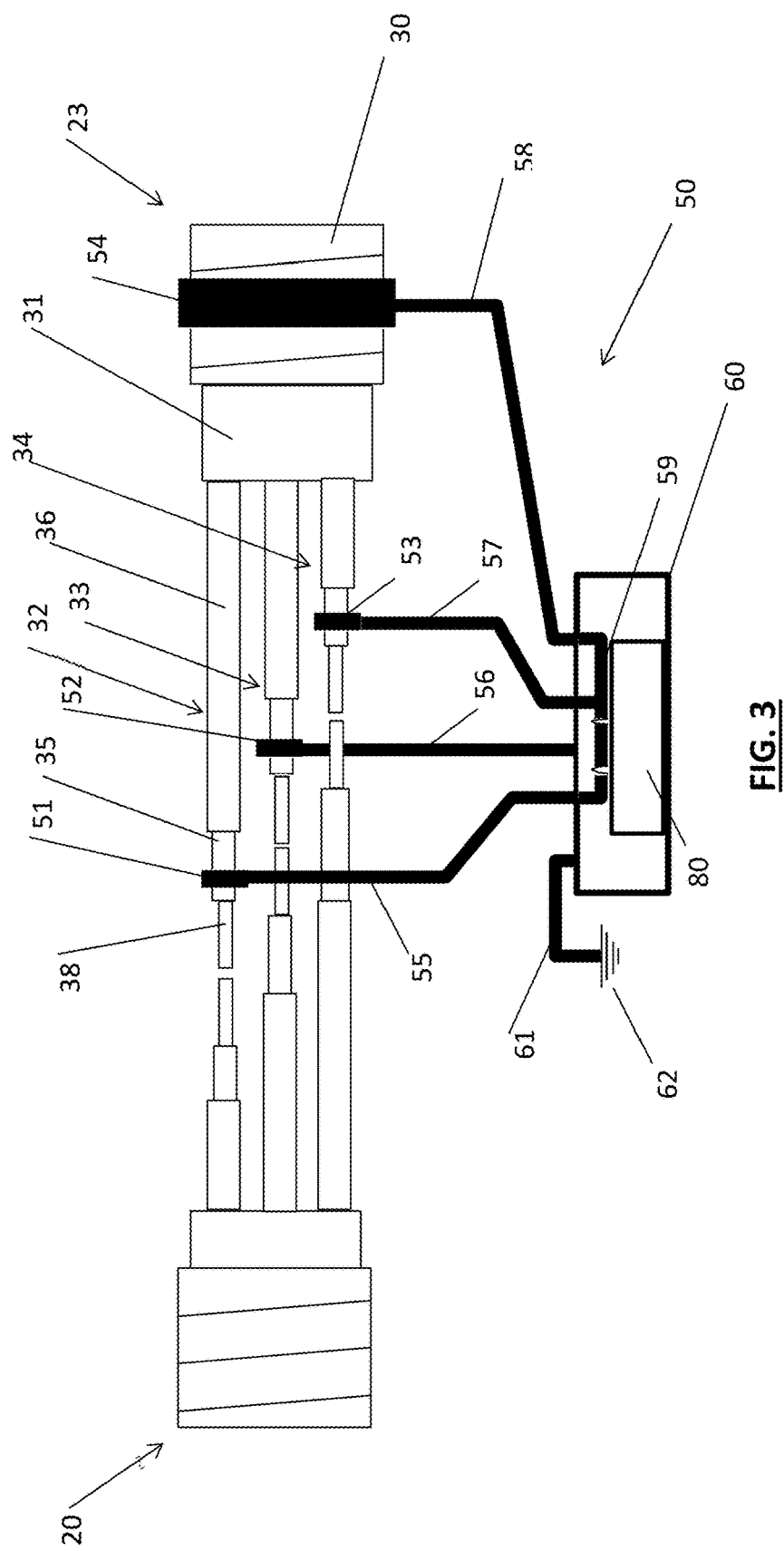
FIG. 3 is a schematic representation of an electrical grounding system of an embodiment of the present invention.

Referring now to FIG. 3, there is shown MLE 23 previously prepared for such a field splice to power supply cable 20 and an embodiment of an SGA 50 in accordance with the present invention. Shown in the figure is MLE 23 which is connected to PMM 16 via pot head connector 22 (FIG. 1).

As described herein above with reference to FIG. 2, MLE 23 may comprise, metallic armor 30, a protective insulating jacket 31 inside of which are disposed three insulated conductors 32, 33, 34. As is known in the art, electrical current is carried by conductors 38 to and from the motor, and as described herein above if the shaft of PMM 16 is rotating a significant voltage may be present within insulated conductors 32, 33, 34.

As discussed herein above, and as will be appreciated by those skilled in the art, that while splicing MLE 23 to power cable 20 the conductors 38 are exposed and present hazards such as shock and sparking. The primary voltage hazard arises when contact is made across two conductors 38. It is an aspect of the present invention that if conductors 38 are shorted together there can be no voltage across them. If the shaft of PMM 16 is rotating, the internal generator voltage of the motor will however drive a current through a short circuit of conductors 38, limited by the impedance of the motor winding and the shorted conductors. The present invention takes advantage of the known characteristic of permanent magnet motors, that this current flow will result in a braking torque and advantageously a reduction in the speed of the motor and pump. The current flow may be detected as hereinbelow described so as to provide an indication of rotation and hence a warning to stop work as a further safety precaution.

Still referring to FIG. 3, an embodiment of SGA 50 is shown connected to MLE 23 to render the insulated conductors 32, 33, 34 safe. It is an important aspect of the present invention that SGA 50 be positioned between an operator and PMM 16. Clamp 51 may comprise a piercing type clamp that when positioned as shown on insulation 35 of insulated conductor 32 it pierces through the insulation and makes electrical contact with conductor 38. In some embodiments of the present invention clamp 51 may be installed over multiple layers of insulation such as insulation 35 and metallic lead protection 36 and wherein the clamp pierces the multiple layers of insulation and makes contact with conductor 38. Clamp 51 is electrically coupled to conductor 55 which is in turn connected to buss bar 57 mounted inside of enclosure 60. Clamps 52, 53 are similarly in electrical contact with conductors 38 of insulated conductors 33, 34 and are respectively coupled to conductors 56, 57 and connected to bus bar 57. SGA 50 further includes clamp 54 electrically coupled to metallic armor 30 which is electrically connected to bus bar 59 via conductor 58. As described herein below, the present invention provides an additional safety feature in that junction box 60, as well as bus bar 59, may be electrically grounded via conductor 61 run to a suitable ground 62. As one skilled in the art can appreciate, with SGA 50 of the present invention installed as described any electrical potential in motor lead cable 23 is shorted and may further be run to ground 62 rendering insulated conductors 32, 33, 34 safe to handle. Although the embodiment of SGA 50 is shown with piercing clamps 51, 52, 53, separate conductors 56, 57, 58 and an enclosure 60, any assembly of components that short pairs of conductors 38 and which may also run the conductors and armor 30 to ground is within the scope of the present invention.

Given the aforementioned description of SGA 50 if the exemplary pair of conductors 38 are isolated from earth, and only one conductor is touched by an operator then no shock or sparking hazards can result. However, if an earth fault on one of the conductors 38 occurs in PMM 16 or MLE 23 during work on the MLE then a hazard exists from the other conductors to earth 62. It should be appreciated that this secondary fault case is well known in electrical installation practice using the "IT" floating power system. In normal electrical installations this secondary fault is not immediately hazardous and an insulation monitor may be used to detect and warn of its occurrence. It should be further appreciated however that when working on conductors 38 in utilizing the present invention there may be an immediate touch hazard. Therefore, certain embodiments of the present invention preferably includes a further step of shorting the conductors 38 to ground 62 via conductor 61. Although armor 30 is inevitably in contact with metallic parts of the production tubing, and therefore likely in contact with ground, it is preferable to explicitly ground it as with conductor 58.

Example Methods of Employing an SGA of the Present Invention

The reliability of splices and other means of connection is an essential part of the economics of artificial lift systems and ESP's in particular, wherein the loss of production and rig costs associated with a repair are extremely costly. Therefor it is a further objective of the present invention to allow existing established practice for induction type motors to be followed as closely as possible when permanent magnet motors are used. The splicing operation of the exemplary method described herein below closely resembles that practiced in the art of induction motor driven ESP systems.

An exemplary method of employing the SGA 50 of the present invention is illustrated with reference to FIGS. 3 and 4. With PMM 16 installed within 18 (FIG. 1) MLE 23 is prepared for splicing to power cable 20 by installing SGA 50 onto the MLE as will be described directly herein below. Prior to splicing, MLE 23 is typically presented to an operator as a straight cable that has been terminated by, for example, sawing. The operator, while using insulated gloves, removes a portion of wound armor 30, strips back the protective insulating jacket 31, and exposes the insulated conductors 32-34.

Figure 4:
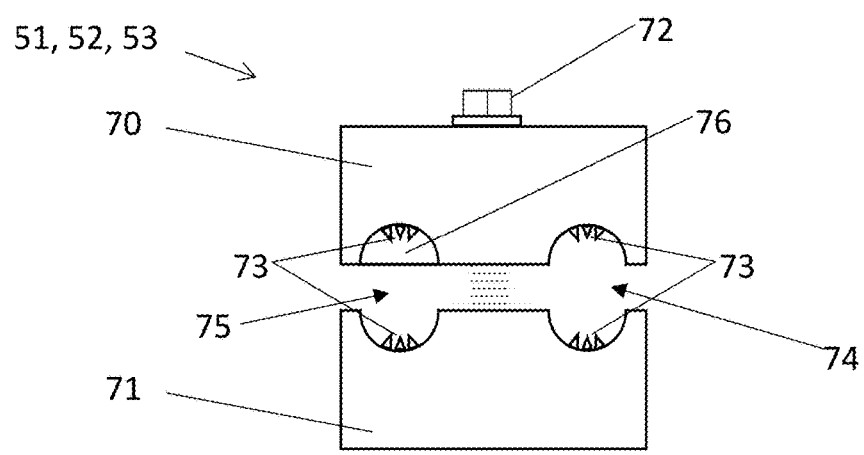
FIG. 4 is an end view of a piercing clamp in accordance with an embodiment of the present invention.

Referring now to FIG. 4 there is shown an exemplary embodiment of piercing clamps 51, 52, 53 that may be installed, preferably while wearing gloves. Piercing clamps 51, 52, 53 may advantageously comprise a modified version of piercing clamp IPC I/O-#2 manufactured and offered for sale by Ilsco Kupler®. The piercing clamps include an insulating top block 70, an insulating bottom block 71, and isolated clamping bolt 72. Upper block 70 and lower block 71 include a metal bar (not shown), which metal bar includes teeth 73 mounted on either end of the bar, within conductor terminals 74, 75 formed within the upper and lower block pairs. The aforementioned modification of the piercing block includes the removal of a bulkhead and a second pair of toothed bars as a single piercing position is desired to minimize damage to insulation 35. During installation of SGA 50, each of the conductors 38 of the three insulated conductors 32-34 and shorting conductors 55-57 are connected to separate piercing clamps in respective pairs as shown in FIG. 3. An end of a shorting conductor 55-57, which shorting conductor may advantageously be insulated, is inserted within conductor channel 75 of piercing clamp and against bulkhead 76. Similarly an insulated end of a conductor 38 of MLE 23 is inserted into and through conductor channel 74 of the piercing clamp. Bolt 72 is tightened to urge bottom block 71 towards top block 70 and forcing teeth 73 to penetrate insulation 35 of the respective insulated conductor and making electrical contact with the conductor 38 encapsulated therein. It should be noted that the clamp should be positioned on the insulation 35 as close as practicable to the point to which the insulation of conductor will subsequently be trimmed back. This allows the piercing holes in the insulation caused by teeth 73 to be easily sealed and protected as part of the normal splicing operations to seal the splice. Once SGA 50 is installed as described the shock and spark hazards have been neutralized and the splicing operation may continue with less caution. As is normally practiced in the art, the operator prepares the conductors 38 for splicing by removing insulation layers 35, 36 to expose the conductors. It should be noted that such an embodiment of a piercing clamp may accommodate all commonly employed submersible pump conductor sizes. Alternative embodiments of the piercing clamp described above include a device that may have molded shorting and earth connections and a more compact piercing/cutting head, that may preferably be installed without tools, such as lever operated.

Power cable 20 may be comprised of the same or similar components as MLE 23 as described herein above. The same operation of preparing power cable 20 for splicing may typically performed on each end the power cable at least to expose the conductors. In the art it is common practice, and necessary for safely practicing the present invention, to short the conductors of the uphole end of power cable 20, using a terminal block for instance. If a second SGA is used in place of the terminal block, the present invention has the advantage of monitoring the splice during the completion of the splice. Once SGA 50 is installed as described, power cable 20 may be brought into position as shown in FIG. 3. In such a position MLE 23 may be spliced to power cable 20 by, for example, installing a conducting splice member, such as a ferrule crimp (not shown), onto conductors 38 of both MLE 23 and power cable 20. The piercing clamps 51-53 may then be removed one-by-one and then, using insulating and amalgamating tapes, the splice is encapsulated and completed. The danger of shock and sparking does not exist at this stage of the splicing operation because MLE 23 is shorted at opposite uphole end. Splice connection 21 may alternatively be performed by any known method included those disclosed herein before. It is within the scope of the present invention that the same SGA 50 and method described herein above may be used to join subsequent lengths of power cables 20 to each other at for instance, penetrators, joints and wellhead outlets.

The embodiment of SGA 50 in FIG. 3 may advantageously also include a module 80 mounted within junction box 60. Module 80 may be variously connected to buss bar 59 and/or the shorting conductors 55-57 and to various testing and monitoring devices such as devices to measure voltage, current and impedance. Module 80 may further include a display or other device to demonstrate the connectivity and thereby the effectiveness of SGA 50 to render the electrical conductors safe.

With reference to FIG. 3 in general, and module 80 specifically, various embodiments of the present invention referred to herein above will be described. It is advantage of the present invention that SGA 50 has the ability to continuously monitor the continuity of the shorted conductors 38, such that operators can be instantly warned of a protection fault such as by indicators and annunciators included in module 80 (not shown). It is a further advantage of the present invention to be able to detect whether the shaft of PMM 16 is actually turning, since personnel can then cease work temporarily as a further safety measure. Yet another advantage of the present invention is the ability to measure the speed of rotation of the shaft of PMM 16 since the internal voltage of a PMM is exactly proportional to speed and so can be determined. At sufficiently low speed the voltage will not be hazardous. The ability to determine rotational speed as well as the shorted motor current may give valuable insight into the nature of the cause of rotation.

It should be appreciated by those skilled in the art that in the shorted system of the present invention, for each motor phase there is a continuous loop through the motor winding, the motor star point and back up through the other phase connections. Taking advantage of these inherent properties, various conditions of PMM 16 may be realized, monitored, measured and otherwise employed to provide further safety to operators.

As an example of the foregoing, for continuity one of the shorting conductors, say 55 for example, may be passed through the core of a small transformer (not shown). The transformer primary can be energized by a simple oscillator circuit, causing current to be induced in a phase conductor, returning via the other shorting conductors 56, 57. A low value resistance, perhaps only a few milliohms, can be inserted in series with each of the shorting conductors 56, 57, and the voltage drops across them may be sensed using known methods. There will no voltage on a connection that is open circuit. The frequency of the oscillator should be high enough for the transformer to work well but low enough that the series inductance of the motor windings presents too high an impedance to allow a measurable current flow.

Again, and as another example, for detection of rotation of the shaft of PMM 16, it will be apparent a rotating motor shaft will generate current into a short circuit in proportion to its internal voltage (emf) and series impedances. This alternating current is measurable from the voltage drop across the aforementioned resistances. The current readily reaches many amperes and can be distinguished from the continuity circuit by frequency range and large amplitude. It is known that the frequency of the current from PMM 16 is inherently an exact indicator of speed. An alternative embodiment to utilizing resistances, other current transducers such as flux gate and hall effect sensors as made by LEM (lem.com) may be used.

An important aspect of all the aforementioned methods of motor current measurement is that they work continuously from DC through the maximum frequency of the motor. These methods work for ESP systems using permanent magnet motors having used for PCPs as well as centrifugal pumps. As an example, a 4-pole motor rotating at 1800 rpm generates current at a frequency of 60 Hz but at 180 rpm it is only 6 Hz. A motor wound for say 600V operation at 180 rpm would produce a hazardous 60V at 18 rpm (48V being a widely accepted maximum safe voltage). However at 18 rpm the frequency of the current would be only 0.6 Hz. This example shows the advantages of the features of module 80 of the present invention. Conventional widely available handheld meters would be ineffective at performing such monitoring in that are designed to either measure DC or to measure AC above a few Hz. Even on DC+AC ranges the same limitation applies. At 0.6 Hz there may be a slight indication when set to DC or DC+AC but on AC there will no reading at all.

It should be noted that the present invention further includes the termination of a MLE 23 with a "touch safe" connector (not shown) that would in itself be connected to the electrical connectors and allow manipulation and connection of the MLE to the power cable with minimal risk of electrical shock or sparking. The present invention further includes a removable terminating connector (not shown) for connecting with the touch safe connector and safely terminating MLE 23 thereby. It is within the scope of the present invention that the terminating connector includes the features and components of monitor 80 described herein above.

While the foregoing is directed to embodiments of the present invention for use in conventional tubing deployed ESP systems, other systems utilizing permanent magnet motors where a similar risk of shock hazard exists such as electric drilling, rigless completions, coiled tubing and the like are within the scope of the present invention.

While the foregoing is directed to embodiments of the present invention, other and further embodiments of the invention may be devised without departing from the basic scope thereof, and the scope thereof is determined by the claims that follow.

What is claimed is:

1. A safe grounding apparatus for attachment to a motor lead end electrically coupled to a permanent magnet motor comprising:
   the motor lead end including a plurality of electrical conductors enclosed within a layer of insulation;
   a plurality of clamps adapted to pierce the layer of insulation and be selectively electrically coupled to the plurality of electrical conductors of the motor lead end;
   a plurality of shorting conductors adapted to electrically couple to the clamps and extend therefrom; and
   the shorting conductors adapted to electrically couple to a bus bar to electrically short the shorting conductors.

2. The safe grounding apparatus of claim 1, wherein the motor lead end is overwrapped with a metallic armor, the apparatus further comprising a conductor adapted to electrically couple to the metallic armor and the bus bar.

3. The safe grounding apparatus of claim 2, further comprising a grounded conductor adapted to connect to the bus bar and extend therefrom and electrically ground the shorting conductors to earth.

4. The safe grounding apparatus of claim 1, wherein the clamps include a plurality of teeth disposed within the clamps adapted to pierce the layer of insulation and contact the electrical conductors and thereby electrically couple the power cables and the shorting conductors.

5. The safe grounding apparatus of claim 1, further comprising the bus bar mounted within a module, the module further comprising at least one monitoring device adapted to monitor at least one condition of the motor lead end and the permanent magnet motor.

6. The safe grounding apparatus of claim 5, wherein the at least one monitoring device measures a voltage, a current or an impedance.

7. The safe grounding apparatus of claim 6, wherein the module includes a display, an indicator or an annunciator coupled to the at least one monitoring device.

8. The safe grounding apparatus of claim 6, wherein the at least one condition includes a speed of the permanent magnet motor.

9. The safe grounding apparatus of claim 1, wherein the shorting conductors coupled to the bus bar is adapted to produce a braking torque in the permanent magnet motor.

10. A method for rendering a motor lead end coupled to a permanent magnet motor safe, the method comprising:
    providing a plurality of clamps;
    selectively electrically coupling the clamps to a plurality of electrical conductors of a plurality of power cables of the motor lead end;
    electrically coupling the clamps to a plurality of shorting conductors;
    electrically coupling the shorting conductors to a bus bar; and
    monitoring at least one condition of at least one of the motor lead end and the permanent magnet motor.

11. The method of claim 10, further comprising electrically grounding the shorting conductors to earth.

12. The method of claim 10, wherein the electrical conductors include an insulation, the method further comprising the clamps piercing the insulation contacting the electrical conductors and thereby electrically coupling the power cables and the shorting conductors.

13. The method of claim 10, wherein the at least one condition includes a current, a voltage, or an impedance.

14. The method of claim 10, further including displaying, indicating or annunciating a condition related to the at least one condition.

15. The method of claim 10, wherein the plurality of power cables are overwrapped by a metallic armor, the method further comprising electrically coupling the metallic armor to the shorting conductors shorting the metallic armor.

16. The method of claim 10, wherein electrically coupling the shorting conductors to the bus bar produces a braking torque in the permanent magnet motor.

17. The method of claim 10 further comprising terminating the motor lead end at an uphole end such that the plurality of clamps are positioned between the uphole end and the permanent magnet motor.

18. The method of claim 17 further comprising preparing the motor lead end for splicing after the terminating step.

19. The method of claim 17, wherein the terminating step comprises sawing the motor lead end.

20. The method of claim 10, wherein the monitoring at least one condition comprises determining if a hazard is present.

21. The method of claim 20, wherein the hazard comprises a shock, a sparking, or an earth fault.

* * * * *